R. W. CATCHING.
VACUUM BRAKE.
APPLICATION FILED MAR. 19, 1920.
1,403,290.
Patented Jan. 10, 1922.
2 SHEETS—SHEET 1.
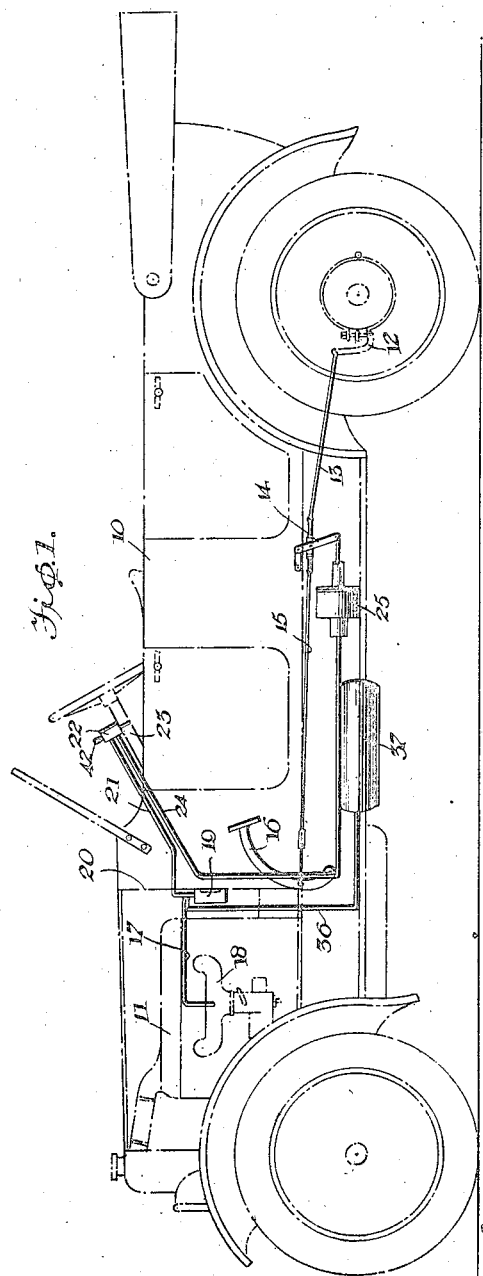
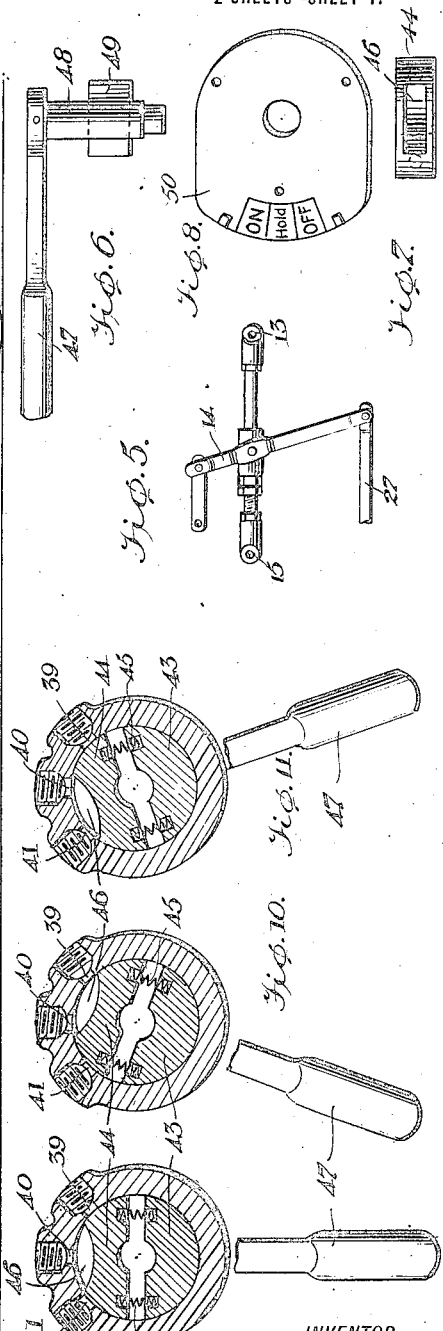
WITNESSES
INVENTOR
R. W. Catching,
BY
ATTORNEYS

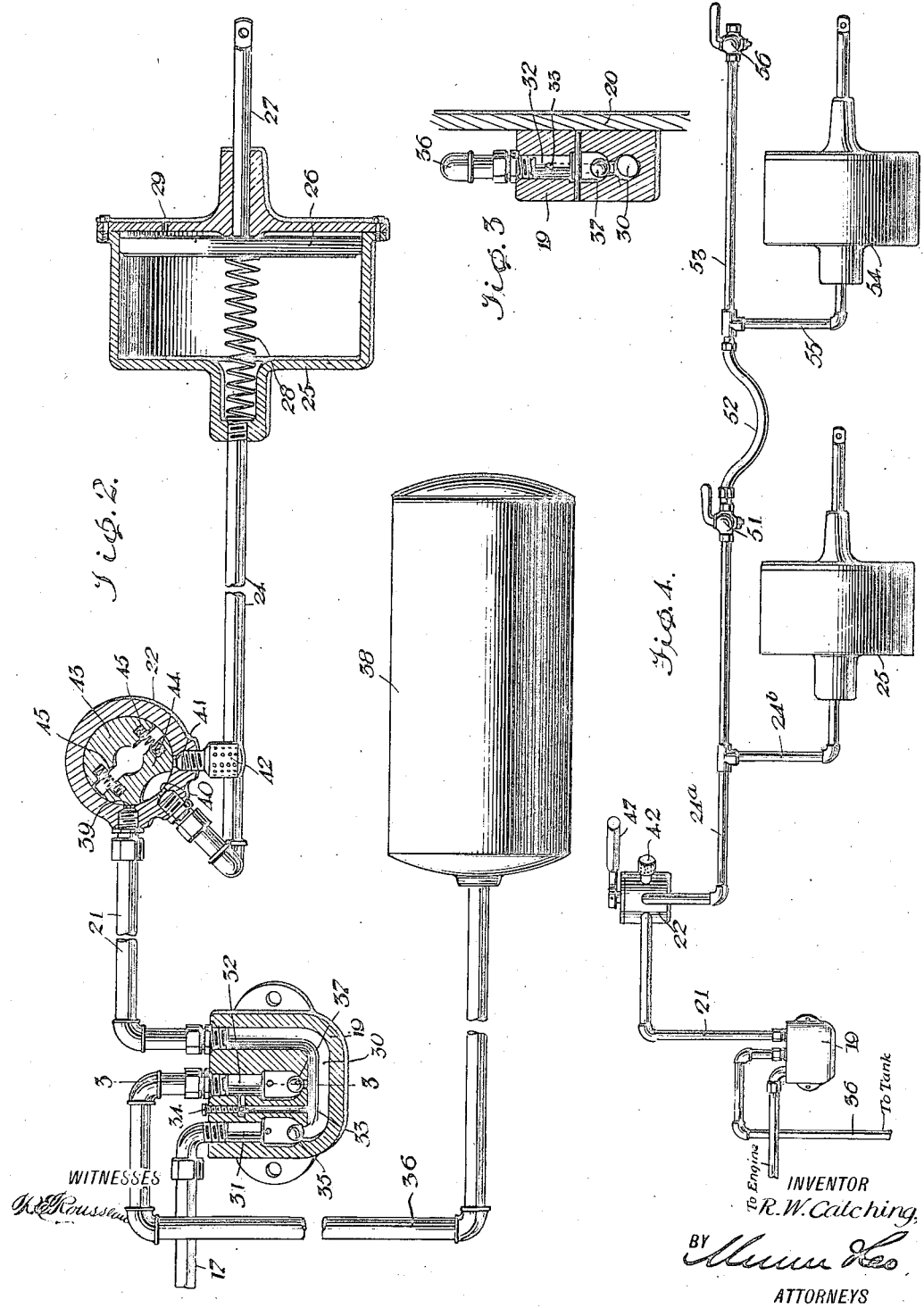

UNITED STATES PATENT OFFICE.

ROY WEBBER CATCHING, OF ROSEBURG, OREGON.

VACUUM BRAKE.

1,403,290.  Specification of Letters Patent.  Patented Jan. 10, 1922.

Application filed March 19, 1920. Serial No. 367,131.

*To all whom it may concern:*

Be it known that I, ROY WEBBER CATCHING, a citizen of the United States, and a resident of Roseburg, in the county of Douglas and State of Oregon, have invented certain new and useful Improvements in Vacuum Brakes, of which the following is a specification.

My present invention relates generally to vacuum brakes and more particularly to brakes for vehicles employing internal combustion engines, the primary object of my invention being the provision of an effective fluid pressure brake arrangement, actuated by the suction of an internal combustion engine and capable of attachment to the foot actuated brake connections of an automobile, motor truck and the like in such manner as to permit of free actuation of the foot actuated parts.

Further objects of my invention will be apparent from the following description in which reference is made to the accompanying drawings, forming a part of this specification and wherein, Figure 1 is a side view illustrating the practical application of my invention, Figure 2 is a diagram of the fluid pressure connections, Figure 3 is a vertical section through the regulator taken substantially on line 3—3 of Figure 2, Figure 4 is another diagram illustrating the possibilities of extension of the brake system to trailers, Figure 5 is a detail side view of certain of the brake connections, Figure 6 is a perspective view of the handle and stem of the controller valve, Figure 7 is a side view of the controller valve piece, Figure 8 is a top plan view of the controller valve casing, and Figures 9, 10 and 11 are sectional views through the controller valve illustrating its different positions.

Referring now to these figures and particularly to Figure 1 I have shown a motor vehicle generally indicated at 10, its internal combustion engine appearing at 11 and its wheel hub engaging brakes appearing at 12, the latter actuated by rods 13 from a lever 14, in turn actuated through a connecting rod 15, and foot pedal 16.

In accordance with my invention one end of a pipe 17 is tapped or otherwise suitably connected into the intake manifold 18 of the engine 11, its opposite end being connected to a regulator valve 19 which may be secured upon the dash 20.

From the regulator valve 19 a pipe 21 extends to a controller valve 22 mounted on the steering post 23 and thus within convenient reach of the operator. From this controller valve a pipe 24 leads to a brake cylinder 25 having therein, as seen in Figure 2, a piston 26 whose rod 27 projects rearwardly and is connected to the lever 14 previously described. The piston 26 is normally held in rearmost position within the brake cylinder 25 by a spring 28, the rear wall of the brake cylinders having an opening 29 which prevents pressure at the rear of the piston, so that it is thus obvious that the brakes 12 may be set either by foot pressure upon the pedal 16 or by fluid pressure acting on the piston 26 and may thus be manually actuated without interfering with the fluid pressure parts, and vice versa.

As seen in Figure 2 the regulator 19 has a casing including a main channel 30 with one end of which the controller pipe 21 communicates. With this main channel also communicates a pair of ports 31 and 32, as well as one end of a by-pass 33, the opposite end of which communicates with the port 32 under control of an adjustable needle valve 34.

The intake manifold pipe 17 communicates with the port 31 which latter has a ball valve 35 therein seated away from the pipe 17 and toward the channel 30.

A pipe 36 communicates at one end with the port 32 and in this port is a ball valve 37 seated away from the pipe 36 and also toward the channel 30, the opposite end of pipe 36 communicating with a tank 38 which is suitably mounted at a convenient point on the vehicle as for instance beneath the body adjacent to one running board as indicated in Figure 1.

The regulator valve 22 has a casing which is provided with circumferentially spaced ports 39 and 40, respectively communicating with the pipes 21 and 24 and also has an atmospheric port 41 in communication with a screened intake head 42. Within the casing of the regulator valve is a valve piece including opposed segmental sections 43 and 44, normally pressed apart by springs 45 so as to seat both of the segments evenly and firmly against the inner surface of the casing. The segment 44 has a recess 46 which may be moved to place port 40 in communication with either of the ports 39 and 41 and which may be also moved opposite the port 40 alone as seen in Figure 2.

Thus in operation when the engine 11 is running, suction is created in its intake manifold 18 which is communicated through pipe 17 to the port 31 of the regulator valve and acts to lift the valve 35 from its seat so as to communicate with the main channel 30 and through the by-pass 33 to the port 32. In this way air will be gradually exhausted from, and pressure below atmospheric created within the vacuum supply tank 38, under control of the needle valve 34 which is adjusted so that this action is sufficiently slow to obviate interference with operation of the engine. At this time the controller valve piece is in the position shown in Figures 2 and 9 opposite the port 40 alone, where it is held by virtue of its handle 47 seen in Figure 6, this handle having a stem 48 with wings 49. The steam 48 extends downwardly through the cover 50 of the controller valve casing, the latter of which is marked to indicate the respective positions of the valve piece actuated by virtue of the extension of the wings 49 between the segments 43 and 44.

When a service application is to be made handle 47 is shifted to the "on" position, moving the valve piece to the position of Figure 10 where its recess 46 places ports 39 and 40 in communication. Suction is communicated to pipe 24 and to the brake cylinder 25 from pipe 21, and this suction proceeds through the regulator valve direct from the engine except in the event that the greater pressure below atmospheric within the tank 38 when it proceeds from the latter.

The suction within the brake cylinder 25 pulls the piston 26 forwardly against the tension of its spring 28 and the brakes are thus applied and may be held if desired by shifting the valve piece back to the position shown in Figure 2. When the brakes are to be released however the valve piece is shifted so that its recess places ports 40 and 41 in communication, or to the position shown in Figure 11, and air intermediately enters through the screened air intake 42 to displace the vacuum in the brake cylinder. Spring 28 then acts to shift the brake cylinder piston 26 rearwardly to released position.

As seen in Figure 4, instead of a pipe 24 leading direct to the brake cylinder 25 from the controller valve 22, a pipe 24ᵃ may be utilized with a branch 24ᵇ extending to the brake cylinder, and pipe 24ᵃ may be extended to the rear of the vehicle and provided adjacent to its rear extremity with a cut off valve 51 so as to provide for its connection by a flexible hose 52 with a similar pipe 53 on a trailing vehicle having a brake cylinder 54 and a branch pipe 55 leading from pipe 53 to the brake cylinder. Pipe 53 may in turn have a rear cut off valve 56 and it is thus obvious that the system is capable of ready extension to trailing vehicles whereby to provide for the simultaneous application of the brakes of the several vehicles from the operator's position on the lead vehicle or tractor.

It is obvious from the foregoing my invention presents an arrangement capable of ready application to vehicles without disturbing or effecting operation of, the foot actuated brake operating means, as well as a comparatively simple apparatus capable of ready operation and control and of a strong durable nature.

I claim:

1. In a fluid pressure brake of the character described, a suction pipe, a regulator valve with which the suction pipe communicates, a manual control valve in communication with the regulator valve, a fluid pressure cylinder having a movable piston and communicating with the control valve, and a supply tank connected to the regulator valve and having adjustably controlled communication with the suction pipe.

2. In a fluid pressure brake, a suction pipe, a regulator valve having a main channel and a pair of ports provided with valves opening toward the main channel and with one of which ports the suction pipe communicates, a supply tank having connection with the other of said ports, said regulator valve having a by-pass communicating between the last mentioned port and its main channel and an adjustable valve controlling said by-pass, a brake cylinder having a movable piston and having connections with the main channel of the regulator valve, and a manual control valve in the last named connections having an atmospheric port as described.

3. In a fluid pressure brake, a suction pipe, a supply tank having connection with the suction pipe, an adjustable valve in said connection, a brake cylinder having a movable piston and having vacuum supply connections, a manual control valve in said connections, and means between the cylinder connections, the tank, and the suction pipe, whereby the said cylinder connections may receive suction from either the tank or the suction pipe.

4. The combination with a vehicle having an internal combustion engine and brakes, of fluid pressure actuating means connected to the brakes, said means including a suction pipe in communication with the intake of the engine, a supply tank having adjustable valved connection with the suction pipe, a brake cylinder, and valved means controlling communication between said brake cylinder and said tank and suction pipe.

ROY WEBBER CATCHING.